UNITED STATES PATENT OFFICE.

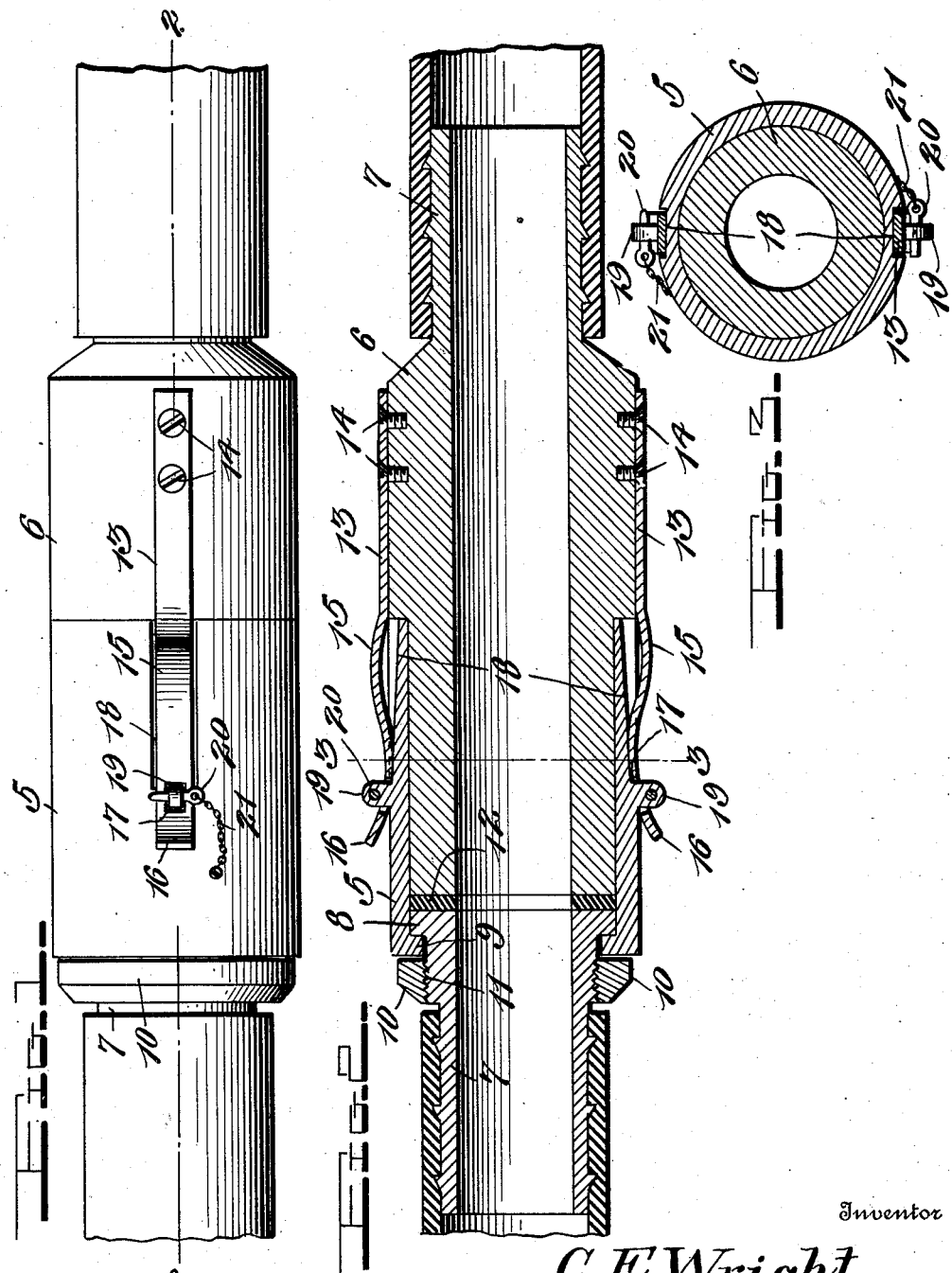

CLARENCE E. WRIGHT, OF APALACHICOLA, FLORIDA.

COUPLING.

1,027,579.  Specification of Letters Patent.  Patented May 28, 1912.

Application filed October 7, 1911. Serial No. 653,303.

*To all whom it may concern:*

Be it known that I, CLARENCE E. WRIGHT, a citizen of the United States, residing at Apalachicola, in the county of Franklin and State of Florida, have invented certain new and useful Improvements in Couplings, of which the following is a specification, reference being had to the accompanying drawings.

This invention relates to couplings and more particularly to an improved hose or pipe coupling, the primary object of which is to provide a device wherein simplicity, durability and a maximum of efficiency are combined.

The invention has for a further object the provision of means whereby the opposed coupling heads may be easily and quickly connected to provide a water-tight joint between two hose or pipe sections.

With the above and other objects in view, the invention consists of the novel features of construction, combination and arrangement of parts hereinafter fully described and claimed, and illustrated in the accompanying drawings, in which—

Figure 1 is a side elevation of a coupling embodying my improvements; Fig. 2 is a section taken on the line 2—2 of Fig. 1; and Fig. 3 is a section taken on the line 3—3 of Fig. 2.

Referring in detail to the drawing 5 designates the female coupling head, and 6 the complementary male coupling head. The coupling head 5 is of greater internal diameter than the head 6 and is swiveled upon the end of the hose section as clearly shown in Fig. 2 so that the hose may rotate relative thereto. This connecting means consists of the circumferentially ribbed or corrugated tubular member 7 which is fitted into the end of the hose. An annular flange 8 is formed upon the end of the member 7 and is adapted to engage with an annular flange or shoulder 9 provided upon the interior of the female coupling head 5 at one end thereof, the member 7 being adapted for insertion into said head at its other end. Upon the member 7 before its insertion into the end of the hose, a retaining ring 10 is arranged, and after said coupling head and the member 7 have been assembled as above disclosed, this ring which is provided with interior screw threads is engaged with the threads 11 formed upon the periphery of the member 7 adjacent the flange 8 thereof. The ring 10 prevents any inward movement of the member 7 with relation to the head 5, the stop flange 9 engaging the flange 8 of said member and preventing any outward longitudinal movement of the same. The member 7 may, however, rotate freely with relation to the coupling head so as to relieve the parts of strain and prevent kinking or breaking of the hose.

On the end face of the flange 8 of the member 7 a gasket 12 preferably of leather is secured in any approved manner and engages closely with the inner surface of the coupling head 5. The end of the male coupling head 6 which is fitted into the head 5 is adapted to engage said gasket which provides a water-tight joint and prevents the escape of water at the said coupling heads at the point of connection of the hose sections thereto. It will of course be understood that the other of the hose sections which is connected to the male coupling head 6 may be swiveled to said head in a similar manner to that above described.

To the periphery of the coupling head 6 at diametrically opposite points, one end of a pair of spring plates 13 is rigidly secured by means of suitable screws or other fastening members 14. The free ends of these spring plates project beyond the coupling head and are slightly bowed outwardly as indicated at 15 for a purpose which will be apparent from the following description. The extremities of the spring plates are reversely curved with relation to the bowed portions as at 16 and are provided with the openings 17. The coupling head 5 is provided in its outer surface and at diametrically opposite points with the longitudinally extending grooves or channels 18 which are adapted to receive the ends of the spring plates 13 to guide the same when the coupling heads are brought together. As the heads are moved in opposite directions, the curved extremities 15 of the spring plates 13 engage the studs or pins 19 which are fixed in the head 5 at the inner ends of the grooves 18, whereby said spring plates are sprung outwardly so that they ride over the pins until the same engage in the openings 17 of the plates. When the pins or lugs 19 are thus disposed, the extremity of the coupling head 6 will be disposed against the gasket 12 of the connecting member between the head 5 and the hose section to which it is connected. Suitable pins 20 are preferably provided which are adapted for insertion through transverse openings in the pins or lugs 19 to securely retain the spring plates 13 thereon and prevent accidental disconnection of the heads. These pins are connected to the head 5 by means of short chains 21 so as to obviate any possibility of their loss. The heads may be readily disconnected by grasping the spring plates 13 at the bowed portions 15 thereof between the thumb and forefingers and pulling the same outwardly whereby they are disengaged from the lugs 19. The heads may then be easily drawn apart.

From the foregoing it is believed that the construction and manner of assembling the invention will be fully understood. The coupling heads may be very quickly and securely connected, and by providing the guide grooves 18 for the spring plates 13, the waste of considerable time in properly disposing of the springs for engagement with the studs 19 is eliminated. Owing to the fact that but few parts are employed in the construction of my improved coupling, it will be obvious that the same is extremely durable and may be manufactured at a comparatively small cost.

While I have shown and described the preferred construction and arrangement of the various elements, it will be understood that the device is susceptible of a great many minor modifications without departing from the essential feature or sacrificing any of the advantages thereof.

Having thus described the invention what is claimed is:—

The herein described coupling comprising male and female heads, said female head having lugs formed upon its periphery intermediate of its ends and at diametrically opposite points, the periphery of said head being further provided with longitudinal grooves extending from the base of the lugs to the end of the head and having their base walls longitudinally and convergently inclined, a pair of spring plates longitudinally disposed upon the male coupling head at diametrically opposite points and rigidly secured thereto at one of their ends, the free ends of said plates being outwardly bowed and having their extremities reversely curved for engagement with the inclined walls of the grooves in said female head, said extremities of the spring plates being guided by said grooves as the heads are brought together and directed against the lugs on the female head, said extremities of the spring plates being provided with openings to receive said lugs, and keys adapted for insertion through apertures in the lugs to retain the spring plates thereon.

In testimony whereof I hereunto affix my signature in the presence of two witnesses.

CLARENCE E. WRIGHT.

Witnesses:
A. S. MOHR,
WM. D. BUZZITT.

Copies of this patent may be obtained for five cents each, by addressing the "Commissioner of Patents, Washington, D. C."